(12) United States Patent
Higashiyama et al.

(10) Patent No.: US 7,971,636 B2
(45) Date of Patent: *Jul. 5, 2011

(54) HEAT EXCHANGER WITH DRAIN GROOVES

(75) Inventors: Naohisa Higashiyama, Oyama (JP);
Sumitaka Watanabe, Oyama (JP);
Shinobu Yamauchi, Oyama (JP)

(73) Assignee: Showa Denko K.K., Tokyo (JP)

( * ) Notice: Subject to any disclaimer, the term of this patent is extended or adjusted under 35 U.S.C. 154(b) by 1223 days.

This patent is subject to a terminal disclaimer.

(21) Appl. No.: 11/571,364

(22) PCT Filed: Jun. 28, 2005

(86) PCT No.: PCT/JP2005/012276
§ 371 (c)(1),
(2), (4) Date: Dec. 28, 2006

(87) PCT Pub. No.: WO2006/004071
PCT Pub. Date: Jan. 12, 2006

(65) Prior Publication Data
US 2007/0209386 A1 Sep. 13, 2007

Related U.S. Application Data

(60) Provisional application No. 60/585,835, filed on Jul. 8, 2004, provisional application No. 60/688,353, filed on Jun. 8, 2005.

(30) Foreign Application Priority Data

Jul. 5, 2004 (JP) .................................. 2004-197956
Nov. 17, 2004 (JP) .................................. 2004-332639

(51) Int. Cl.
*F28F 9/02* (2006.01)
*F28D 7/06* (2006.01)
*F25D 21/14* (2006.01)

(52) U.S. Cl. ........................... 165/174; 165/176; 62/290
(58) Field of Classification Search .................. 165/110, 165/148–153, 173–176; 228/183; 62/290
See application file for complete search history.

(56) References Cited

U.S. PATENT DOCUMENTS
5,141,048 A * 8/1992 Sausner ..................... 165/110
(Continued)

FOREIGN PATENT DOCUMENTS
JP 6 307786 11/1994
(Continued)

OTHER PUBLICATIONS
U.S. Appl. No. 11/571,938, filed Jan. 11, 2007, Higashiyama.

*Primary Examiner* — Cheryl J Tyler
*Assistant Examiner* — Brandon M Rosati
(74) *Attorney, Agent, or Firm* — Oblon, Spivak, McClelland, Maier & Neustadt, L.L.P.

(57) ABSTRACT

A heat exchanger for use as an evaporator includes a heat exchange core having a plurality of heat exchange tubes arranged in a left-right direction at a spacing, and a refrigerant turn tank as a lower tank disposed toward a lower end of the heat exchange core. The heat exchange tubes are inserted through respective tube insertion holes formed in the turn tank and joined to the tank. The turn tank has drain grooves each extending from a forwardly or rearwardly outer end of each of the tube insertion holes for discharging condensation water to below the turn tank therethrough. Each of the drain grooves has a bottom extending gradually downward as the bottom extends away from the tube insertion hole. the exchanger is used as the evaporator, the top surface of the turn tank can be drained of water with an improved efficiency.

20 Claims, 8 Drawing Sheets

U.S. PATENT DOCUMENTS

| | | | |
|---|---|---|---|
| 5,481,886 A * | 1/1996 | Hasegawa et al. | 62/285 |
| 7,036,567 B2 * | 5/2006 | Shimanuki et al. | 165/110 |
| 7,635,019 B2 * | 12/2009 | Higashiyama | 165/110 |
| 7,726,389 B2 * | 6/2010 | Watanabe | 165/176 |
| 7,784,529 B2 * | 8/2010 | Higashiyama | 165/174 |
| 7,896,066 B2 * | 3/2011 | Higashiyama | 165/174 |
| 2004/0016535 A1 * | 1/2004 | Shimanuki et al. | 165/172 |
| 2004/0035559 A1 * | 2/2004 | Ko et al. | 165/110 |
| 2004/0159121 A1 * | 8/2004 | Horiuchi et al. | 62/526 |
| 2006/0162376 A1 | 7/2006 | Higashiyama et al. | |
| 2007/0131385 A1 * | 6/2007 | Misiak et al. | 165/78 |
| 2007/0251681 A1 * | 11/2007 | Higashiyama et al. | 165/153 |
| 2008/0028788 A1 * | 2/2008 | Higashiyama | 62/515 |
| 2008/0041095 A1 * | 2/2008 | Higashiyama | 62/515 |
| 2009/0282850 A1 * | 11/2009 | Higashiyama | 62/239 |

FOREIGN PATENT DOCUMENTS

| | | |
|---|---|---|
| JP | 2002 213840 | 7/2002 |
| JP | 2003 75024 | 12/2003 |

* cited by examiner

HEAT EXCHANGER WITH DRAIN GROOVES

CROSS REFERENCE TO RELATED APPLICATION

This application is an application filed under 35 U.S.C. §111(a) claiming the benefit pursuant to 35 U.S.C. §119(e)(1) of the filing dates of Provisional Applications No. 60/585,835 and No. 60/688,353 filed Jul. 8, 2004 and Jun. 8, 2005, respectively, pursuant to 35 U.S.C. §111(b).

TECHNICAL FIELD

The present invention relates to heat exchangers suitable to use, for example, as evaporators in motor vehicle air conditioners which are refrigeration cycles for use in motor vehicles.

The downstream side (the direction indicated by the arrow X in FIG. 1, the right-hand side of FIG. 3) of the flow of air to be passed through air passage clearances between respective adjacent pairs of heat exchange tubes of the heat exchanger will be referred to herein and in the appended claims as "front," and the opposite side as "rear." Further the upper, lower, left and right sides of the heat exchanger as it is seen from behind toward the front (the upper and lower sides and the left- and right-hand sides of FIG. 2) will be referred to as "upper," "lower," "left" and "right", respectively.

BACKGROUND ART

Heretofore in wide use as motor vehicle air conditioner evaporators are those of the so-called stacked plate type which comprise a plurality of flat hollow bodies arranged in parallel and each composed of a pair of dishlike plates facing toward each other and brazed to each other along peripheral edges thereof, and a louvered corrugated fin disposed between and brazed to each adjacent pair of flat hollow bodies. In recent years, however, it has been demanded to provide evaporators further reduced in size and weight and exhibiting higher performance.

To meet such a demand, the present applicant has already proposed an evaporator which comprise a heat exchange core composed of tube groups in the form of two rows arranged in parallel in the front-rear direction and each comprising a plurality of heat exchange tubes arranged at a spacing, a refrigerant inlet-outlet tank disposed at the upper end of the heat exchange core and a refrigerant turn tank disposed at the lower end of the heat exchange core, the refrigerant inlet-outlet tank having its interior divided by a partition into a refrigerant inlet header positioned on the front side and a refrigerant outlet header positioned on the rear side, the inlet header being provided with a refrigerant inlet at one end thereof, the outlet header being provided with a refrigerant outlet at one end thereof alongside the inlet, the refrigerant turn tank having its interior divided by a partition wall into a refrigerant inflow header positioned on the front side and a refrigerant outflow header positioned on the rear side, the partition wall of the refrigerant turn tank having a plurality of refrigerant passing holes formed therein and arranged longitudinally of the wall at a spacing, the heat exchange tubes of the front tube group having upper ends joined to the inlet header, the heat exchange tubes of the rear tube group having upper ends joined to the outlet header, the heat exchange tubes of the front tube group having lower ends joined to the inflow header, the heat exchange tubes of the rear tube group having lower ends joined to the outflow header. The refrigerant flowing into the inlet header of the inlet-outlet tank flows through the heat exchange tubes of the front tube group into the inflow header of the turn tank, then flows into the outflow header through the refrigerant passing holes in the partition wall and further flows into the outlet header of the inlet-outlet tank through the heat exchange tubes of the rear tube group (see the publication of JP-A NO. 2003-75024).

The evaporator disclosed in the above publication is reduced in weight and improved in performance, so that a larger amount of condensation water is produced over the heat transfer area than in conventional evaporators of the stacked plate type.

Consequently, a relatively great amount of condensation water collects on the top surface of the lower tank and is liable to freeze, entailing the likelihood of impairing the performance of the evaporator.

An evaporator free of such a problem has been proposed which comprises a lower tank having drain grooves formed between respective adjacent pairs of heat exchange tubes (see the publication of JP-A No. 2004-53132).

However, the evaporator disclosed in the latter publication still remains to be improved in the effect to drain the top surface of the lower tank of condensation water.

An object of the present invention is to overcome the above problem and to provide a heat exchanger wherein the lower tank is improved in drainage efficiency for use as an evaporator.

DISCLOSURE OF THE INVENTION

To fulfill the above object, the present invention comprises the following features.

1) A heat exchanger comprising a heat exchange core having a plurality of heat exchange tubes arranged in a left-right direction at a spacing, and a lower tank disposed toward a lower end of the heat exchange core, the heat exchange tubes being inserted through respective tube insertion holes formed in the lower tank and joined to the lower tank, the lower tank having drain grooves each extending from a forwardly or rearwardly outer end of each of the tube insertion holes for discharging condensation water to below the lower tank therethrough.

2) A heat exchanger according to par. 1) wherein each of the drain grooves has a bottom extending gradually downward as the bottom extends away from the tube insertion hole.

3) A heat exchanger according to par. 1) wherein the lower tank has a top surface and front and rear opposite side surfaces, and the lower tank top surface has forward and rearward outer side portions each providing a low portion gradually descending as the low portion extends forwardly or rearwardly outward, the forwardly or rearwardly outer end of each of the tube insertion holes being positioned in the low portion of the top surface.

4) A heat exchanger according to par. 3) wherein the low portion is inclined downward with respect to a horizontal plane as the low portion extends forwardly or rearwardly outward.

5) A heat exchanger according to par. 4) wherein the low portion has an angle of downward inclination of at least 45 degrees with respect to the horizontal plane.

6) A heat exchanger according to par. 3) wherein the lower tank top surface is in the form of a horizontal flat surface except for the forwardly and rearwardly outer side low portions of the top surface.

7) A heat exchanger according to par. 3) wherein each of the drain grooves extends from the forwardly or rearwardly outer end of the tube insertion hole to the corresponding front or rear side surface of the lower tank.

8) A heat exchanger according to par. 7) wherein a bottom of the drain grooves has a portion existing in the low portion of the lower tank top surface and inclined downward with respect to a horizontal plane as the bottom portion extends forwardly or rearwardly outward.

9) A heat exchanger according to par. 8) wherein the bottom portion of the drain groove existing in the low portion of the lower tank top surface is at least 45 degrees in the angle of downward inclination with respect to the horizontal plane.

10) A heat exchanger according to par. 7) wherein each of the drain grooves extends from the forwardly or rearwardly outer end of each tube insertion hole to an intermediate portion of the height of the corresponding front or rear side surface of the lower tank, and the portion of the front or rear side surface of the lower tank where the drain groove is formed is positioned forwardly or rearwardly outwardly of a tank side portion lower than the front or rear side surface portion, with a stepped portion formed therebetween, the drain groove having a lower end opened at the stepped portion.

11) A heat exchanger according to par. 10) wherein the lower tank comprises a first member having the heat exchange tubes joined thereto, and a second member joined to the first member at a portion thereof opposite to the heat exchange tubes, the first member providing the top surface of the lower tank and an upper portion of each of the front and rear opposite side surfaces thereof, the second member providing a bottom surface of the lower tank and a lower portion of each of the front and rear opposite side surfaces thereof, the tube insertion holes and the drain grooves being formed in the first member.

12) A heat exchanger according to par. 11) wherein the stepped portion is provided at a joint between the first member of the lower tank and the second member thereof, and each of front and rear opposite side surfaces of the first member is positioned by the stepped portion forwardly or rearwardly outwardly of the corresponding front or rear side surface of the second member, the drain groove having a lower end opened in the stepped portion.

13) A heat exchanger according to par. 1) wherein left and right opposite side portions of each tube insertion hole in a top surface of the lower tank are inclined downward toward the tube insertion hole.

14) A heat exchanger according to par. 1) wherein the heat exchange tubes arranged in a left-right direction at a spacing are in groups arranged in the front-rear direction in the form of a plurality of rows, and the drain grooves extend from respective forwardly or rearwardly outer ends of the tube insertion holes having inserted therein the respective heat exchange tubes of the tube group positioned at a forwardly or rearwardly outer end, among the tube insertion holes formed in the lower tank.

15) A heat exchanger according to par. 14) which comprises a refrigerant inlet header disposed on the front side of one end of each of the heat exchange tubes and having jointed thereto the group of heat exchange tubes in the form of at least one row, a refrigerant outlet header disposed in the rear of the inlet header and positioned toward one end of each heat exchange tube, the outlet header having joined thereto the remaining heat exchange tubes, a first intermediate header disposed toward the other end of each heat exchange tube and having joined thereto the heat exchange tubes joined to the inlet header, and a second intermediate header disposed in the rear of the first intermediate header and positioned toward the other end of each heat exchange tube, the second intermediate header having joined thereto the heat exchange tubes joined to the outlet header, the two intermediate headers being provided by dividing inside of the lower tank into a front and a rear portion by partition means, the two intermediate headers being held in communication with each other.

16) A heat exchanger according to par. 1) wherein the heat exchange tubes are flat and have their width positioned in the front-rear direction and are 0.75 to 1.5 mm in tube height which is the thickness thereof.

17) A heat exchanger according to par. 1) wherein fins are arranged between respective adjacent pairs of heat exchange tubes and are each a corrugated fin comprising crest portions, furrow portions and flat connecting portions interconnecting the crest portions and the furrow portions, the fins being 7.0 mm to 10.0 mm in height which is the straight distance from the crest portion to the furrow portion, and 1.3 to 1.7 mm in fin pitch which is the pitch of connecting portions.

18) A heat exchanger according to par. 17) wherein the crest portion and the furrow portion of the corrugated fin each comprise a flat portion, and a rounded portion provided at each of opposite sides of the flat portion and integral with the connecting portion, the rounded portion being up to 0.7 mm in radius of curvature.

19) A refrigeration cycle comprising a compressor, condenser and an evaporator, the evaporator comprising a heat exchanger according to any one of pars. 1) to 18).

20) A vehicle having installed therein a refrigeration cycle according to par. 19) as a motor vehicle air conditioner.

With the heat exchanger according to par. 1), the lower tank has drain grooves each extending from the forwardly or rearwardly outer end of each of the tube insertion holes for discharging condensation water to below the lower tank therethrough, so that the condensation water flowing down onto the lower tank flows through the drain grooves and is discharged to below the lower tank. Accordingly, the upper surface of the lower tank can be drained of condensation water with an improved efficiency, preventing a large amount of condensation water from collecting on the lower tank and from freezing, whereby impairment of the performance can be precluded when the heat exchanger is used as an evaporator. Stated more specifically, the water condensate produced over the surfaces of the fins and heat exchange tubes generally flows down along the forwardly or rearwardly outer ends of the tubes. When the drain grooves formed extend from the forwardly or rearwardly outer ends of the respective tube insertion holes, the water flowing down along the forwardly or rearwardly outer ends of the tubes enters directly into the drain grooves, consequently flows through the drain grooves and is smoothly discharged to below the lower tank to give the lower tank improved drainage efficiency.

With the heat exchanger according to par. 2), each of the drain grooves has a bottom extending gradually downward as the bottom extends away from the tube insertion hole. This permits the condensation water to flow through the drain grooves smoothly to achieve an improved water discharge efficiency.

With the heat exchangers according to pars. 3) and 4), the condensation water flowing down the forwardly or rearwardly outer ends of the heat exchange tubes is greatly influenced by gravity, is less likely to remain on the upper tank due to surface tension and is dischargeable with an improved efficiency.

The heat exchanger according to par. 5) exhibits the advantage of the heat exchangers described in pars. 3) and 4) more remarkably.

With the heat exchanger according to par. 6), the air flowing through the air passage clearances between respective adjacent pairs of heat exchange tubes causes the condensation water in the horizontal flat area of the top surface of the lower tank other than the low portion thereof to flow downstream with respect to the direction of flow of the air, i.e., toward the front, overcoming the surface tension with which the water acts to remain on the flat surface. The water enters the drain grooves, flows through the grooves and is discharged to below the lower tank, or flows down the low portion and is discharged to below the lower tank. Consequently a large amount of condensation water is prevented from collecting on the lower tank and from freezing, whereby the impairment of performance is precluded when the heat exchanger is used as an evaporator.

With the heat exchanger according to par. 7), the condensation water flowing through the drain grooves falls to below the lower tank from the lower ends of the groove portions which exist in the front and rear side surfaces of the lower tank. This achieves an improved drainage efficiency.

With the heat exchanger according to par. 8), the condensation water in the drain grooves is subjected to relatively great gravity, which causes the water to overcome surface tension with which the water acts to remain in the groove, with the result the water is discharged.

The heat exchanger according to par. 9) exhibits this advantage more remarkably.

With heat exchanger according to par. 10), the condensation water more easily falls to below the lower tank from the lower end portions of the drain grooves existing in the front and rear opposite side surfaces of the lower tank.

With the heat exchanger according to par. 11), the first member having tube insertion holes and drain grooves can be made, for example, from a metal blank plate by press work, and is relatively easy to make.

With the heat exchanger according to par. 12), the condensation water flowing through the drain grooves easily falls to below the lower tank from the lower ends of the grooves. The portions of the front and rear opposite side surfaces of the lower tank where the drain grooves are formed can be positioned forwardly or rearwardly outwardly of the portions therebelow relatively easily, and the lower ends of the drain grooves can be opened at the lower faces of the stepped portions relatively easily.

With the heat exchanger according to par. 13), recesses are formed between the inclined portions at the left and right opposite sides of each tube insertion hole in the top surface of the lower tank and the lower end portion of each heat exchanger tube, and the condensation water flowing onto the top surface of the lower tank enters the recesses due to a capillary effect, enters the drain groove from the forwardly or rearwardly outer ends of the recesses, flows through the groove and is discharged to below the lower tank. This prevents a large amount of condensation water from collecting on the lower tank and from freezing, whereby the impairment of performance is prevented when the heat exchanger is used as an evaporator.

With the heat exchanger according to par. 16), heat exchange efficiency can be improved, and the increase in air passage resistance suppressed, with a good balance maintained therebetween.

With the heat exchanger according to par. 17), heat exchange efficiency can be improved, and the increase in air passage resistance suppressed, with a good balance maintained therebetween.

BEST MODE OF CARRYING OUT THE INVENTION

An embodiments of the present invention will be described below with reference to the drawings. The embodiment is a heat exchanger of the invention for use as an evaporator in motor vehicle air conditioners wherein a chlorofluorocarbon refrigerant is used.

Figure 1:
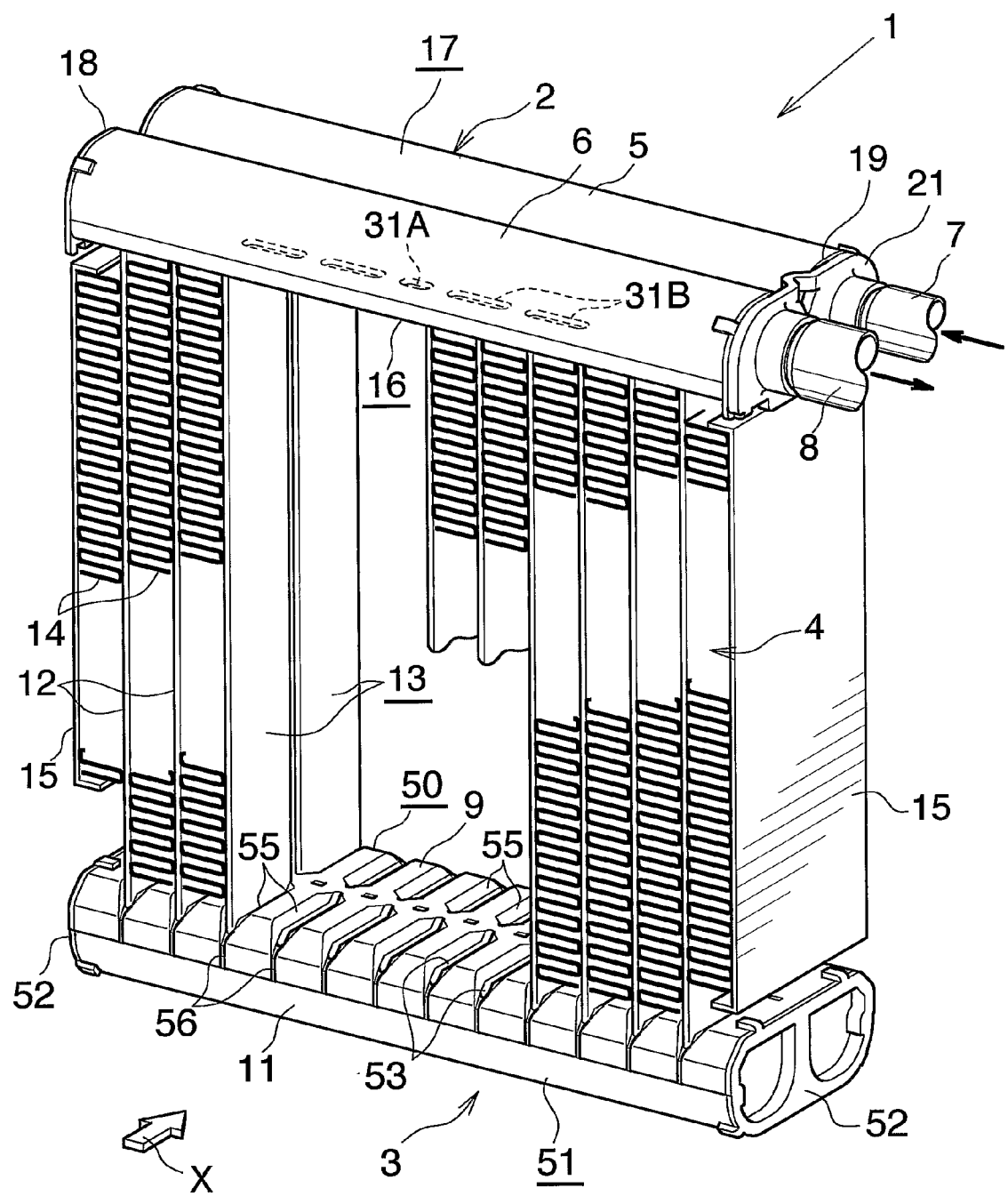
FIG. 1 is a perspective view partly broken away and showing the overall construction of an evaporator to which a heat exchanger of the invention is applied.
Figure 2:
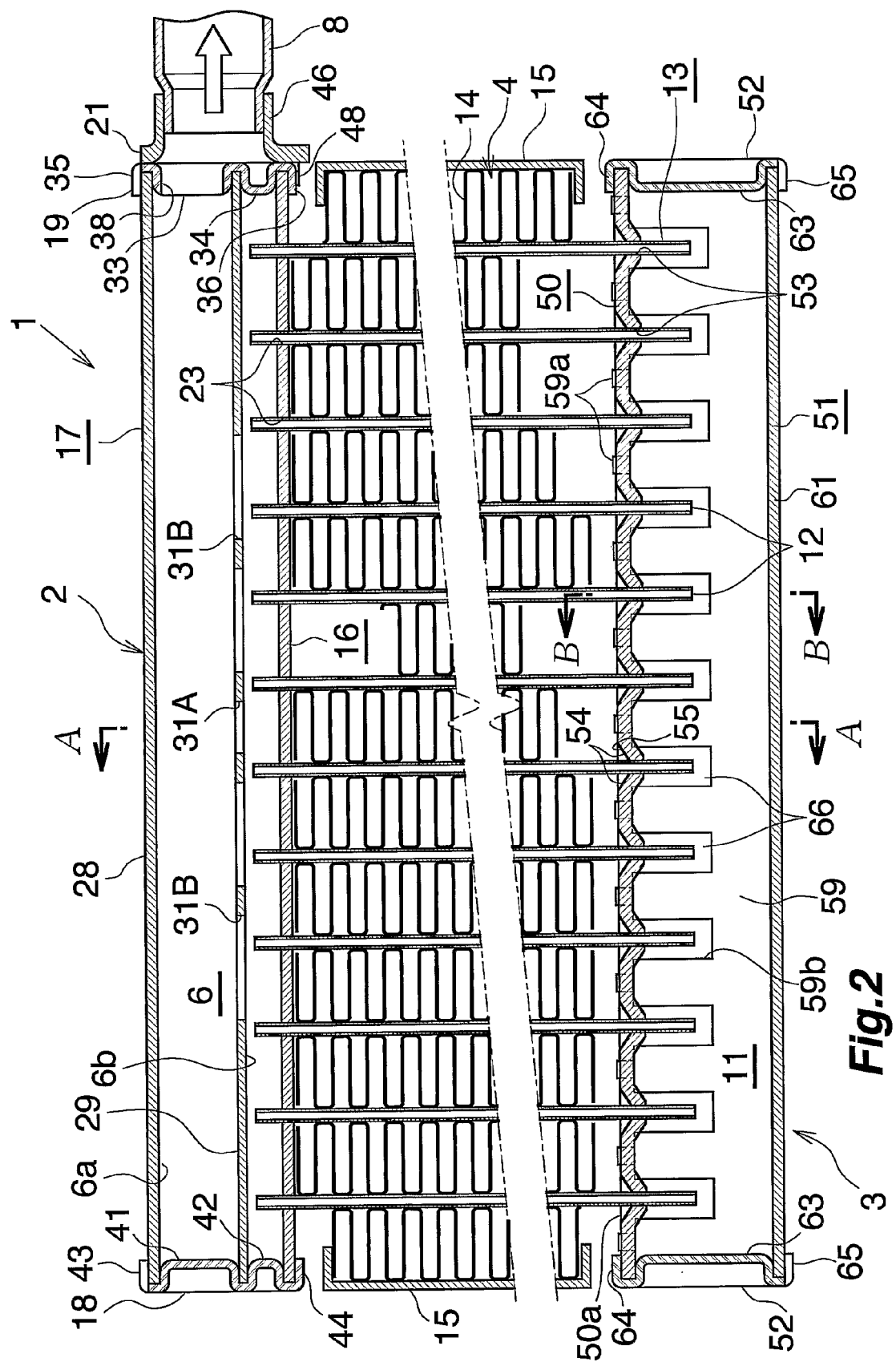
FIG. 2 is a view in vertical section and showing the evaporator of FIG. 1 as it is seen from behind, with an intermediate portion omitted.
Figure 8:
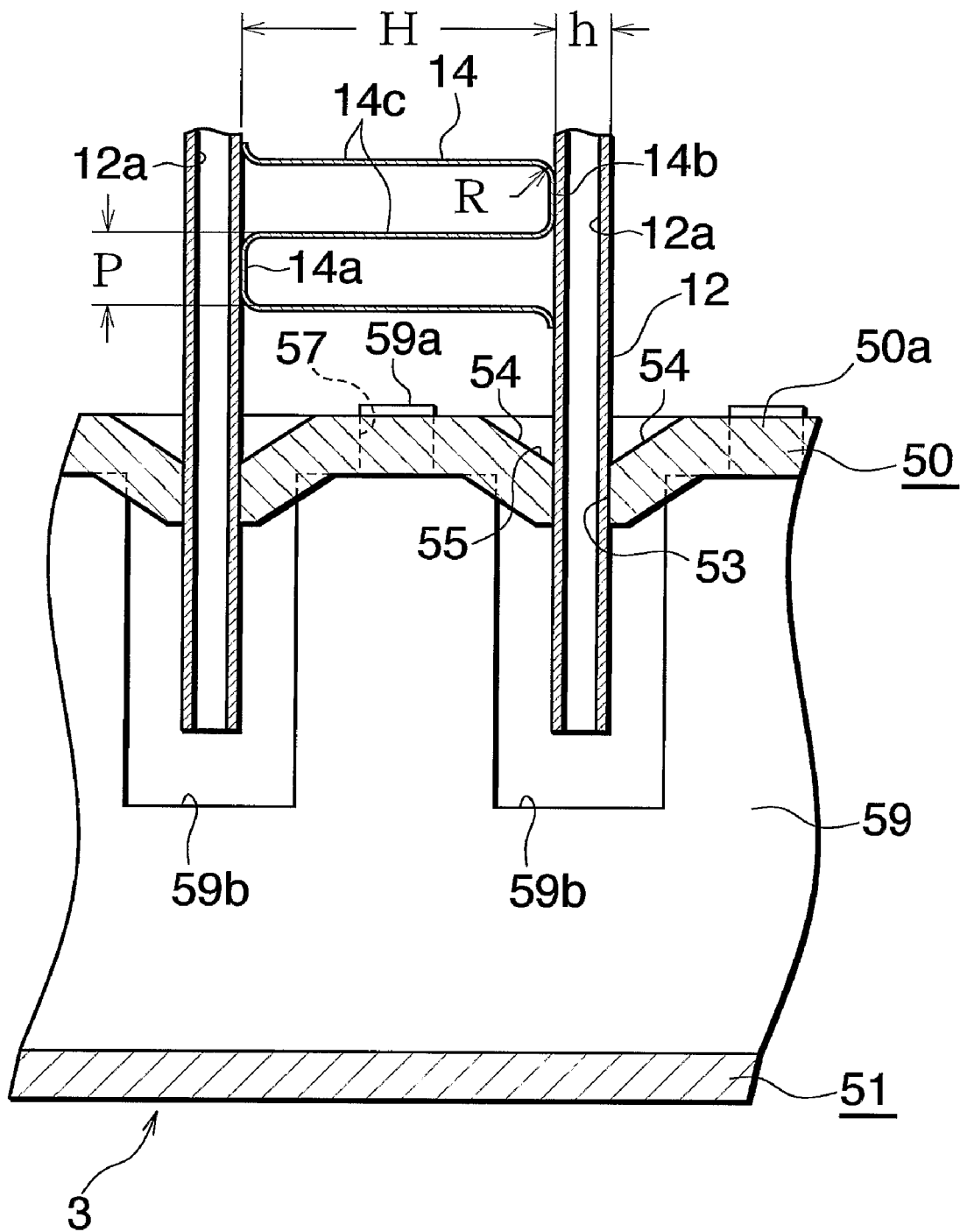
FIG. 8 is a view in section taken along the line D-D in FIG. 3.
Figure 9:
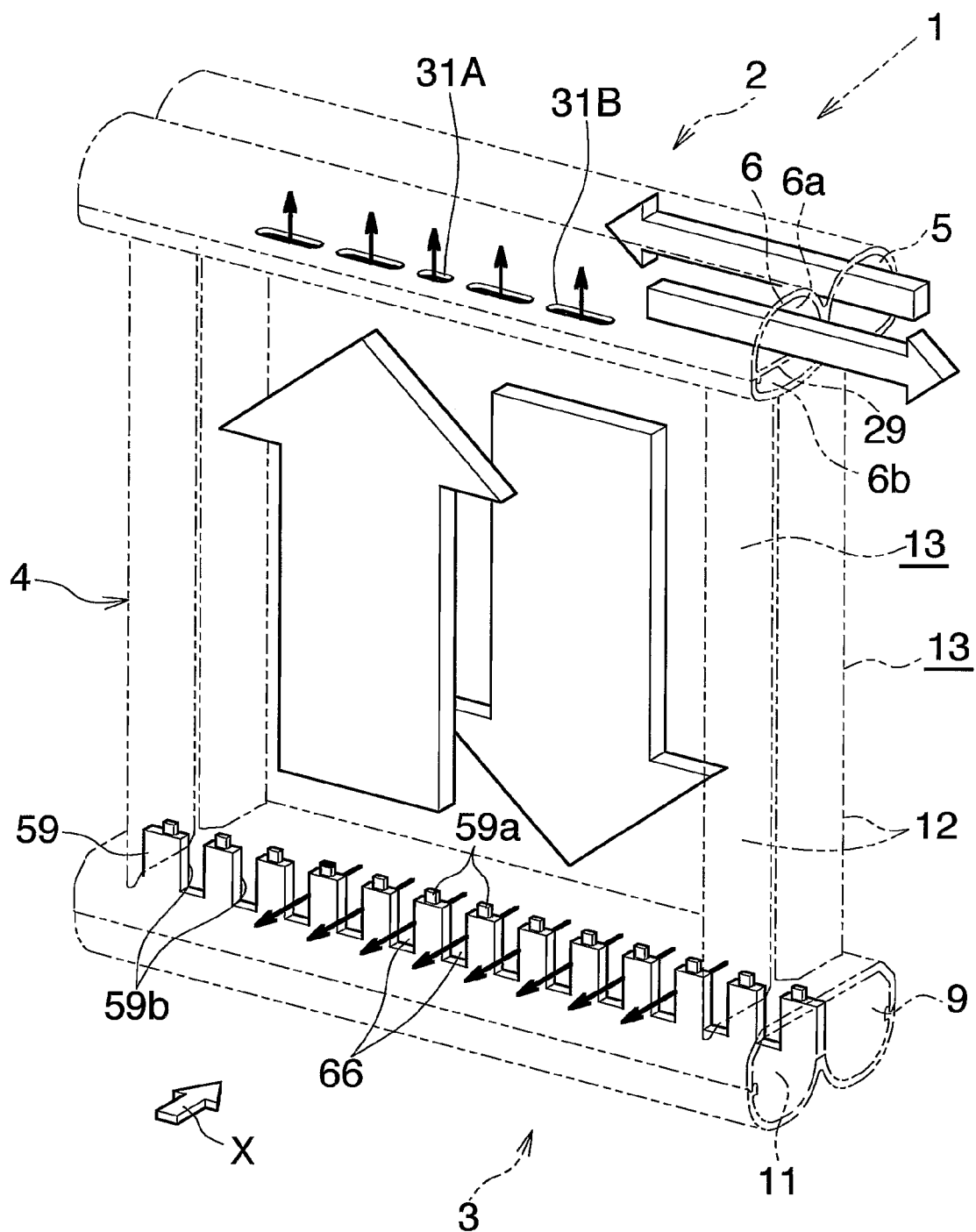
FIG. 9 is a diagram showing how a refrigerant flows through the evaporator shown in FIG. 1.

FIGS. 1 and 2 show the overall construction of a motor vehicle air conditioner evaporator to which the heat exchanger of the invention is applied, FIGS. 3 to 8 show the constructions of main parts, and FIG. 9 shows how the refrigerant flows through the evaporator.

FIG. 1 and 2 show an evaporator 1 for use in motor vehicle air conditioners wherein a chlorofluorocarbon refrigerant is used. The evaporator 1 comprises a refrigerant inlet-outlet tank 2 of aluminum and a refrigerant turn tank 3 of aluminum (lower tank) which are arranged as vertically spaced apart, and a heat exchange core 4 provided between the two tanks 2, 3.

The refrigerant inlet-outlet tank 2 comprises a refrigerant inlet header 5 positioned on the front side (the downstream side with respect to the direction of flow of air through the evaporator), and a refrigerant outlet header 6 positioned on the rear side (the upstream side with respect to the flow of air). A refrigerant inlet pipe 7 of aluminum is connected to the inlet header 5 of the tank 2, and a refrigerant outlet pipe 8 of aluminum to the outlet header 6 of the tank. The refrigerant turn tank 3 comprises a refrigerant inflow header 9 positioned on the front side, and a refrigerant outflow header 11 positioned on the rear side.

The heat exchange core 4 comprises tube groups 13 in the form of a plurality of rows, i.e., two rows in the present embodiment, as arranged in the front-rear direction, each tube group 13 comprising a plurality of heat exchange tubes 12 arranged in parallel in the left-right direction at a spacing. Corrugated fins 14 are arranged respectively in air passing clearances between respective adjacent pairs of heat exchange tubes 12 of each tube group 13 and also outside the heat exchange tubes 12 at the left and right opposite ends of each tube group 13, and are each brazed to the heat exchange tube 9 adjacent thereto. An aluminum side plate 15 is disposed outside the corrugated fin 14 at each of the left and right ends and brazed to the fin 14. The heat exchange tubes 12 of the front tube group 13 have upper and lower ends joined respectively to the inlet header 5 and the inflow header 9, and the heat exchange tubes 12 of the rear tube group 13 have upper and lower ends joined respectively to the outlet header 6 and the outflow header 11. The inflow header 9, the outflow header 11 and all heat exchange tubes 12 constitute a refrigerant circulating passage for causing the inlet header 5 to communicate with the outlet header 6 therethrough.

Figure 3:
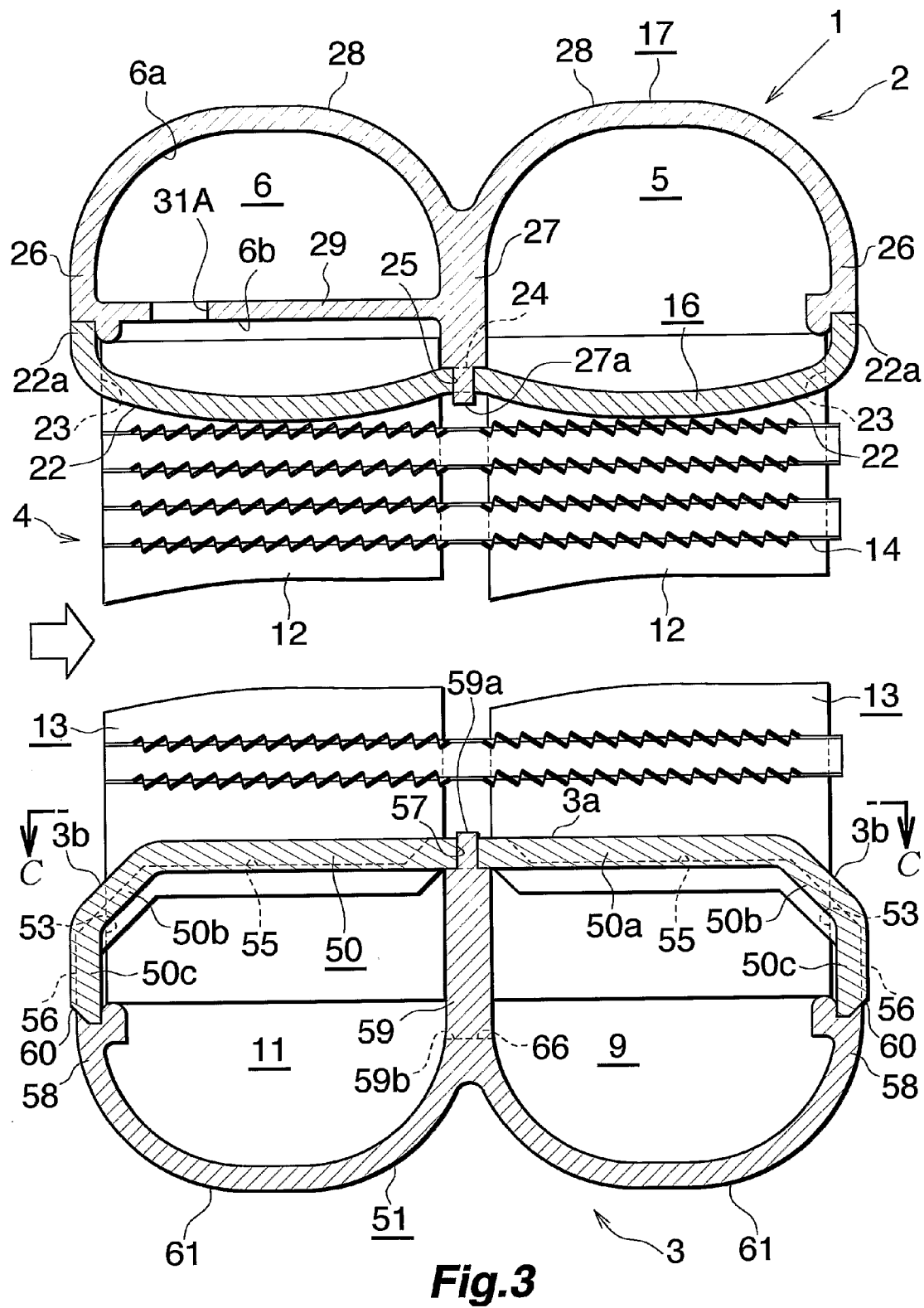
FIG. 3 is an enlarged fragmentary view in section taken along the line A-A in FIG. 2.
Figure 4:
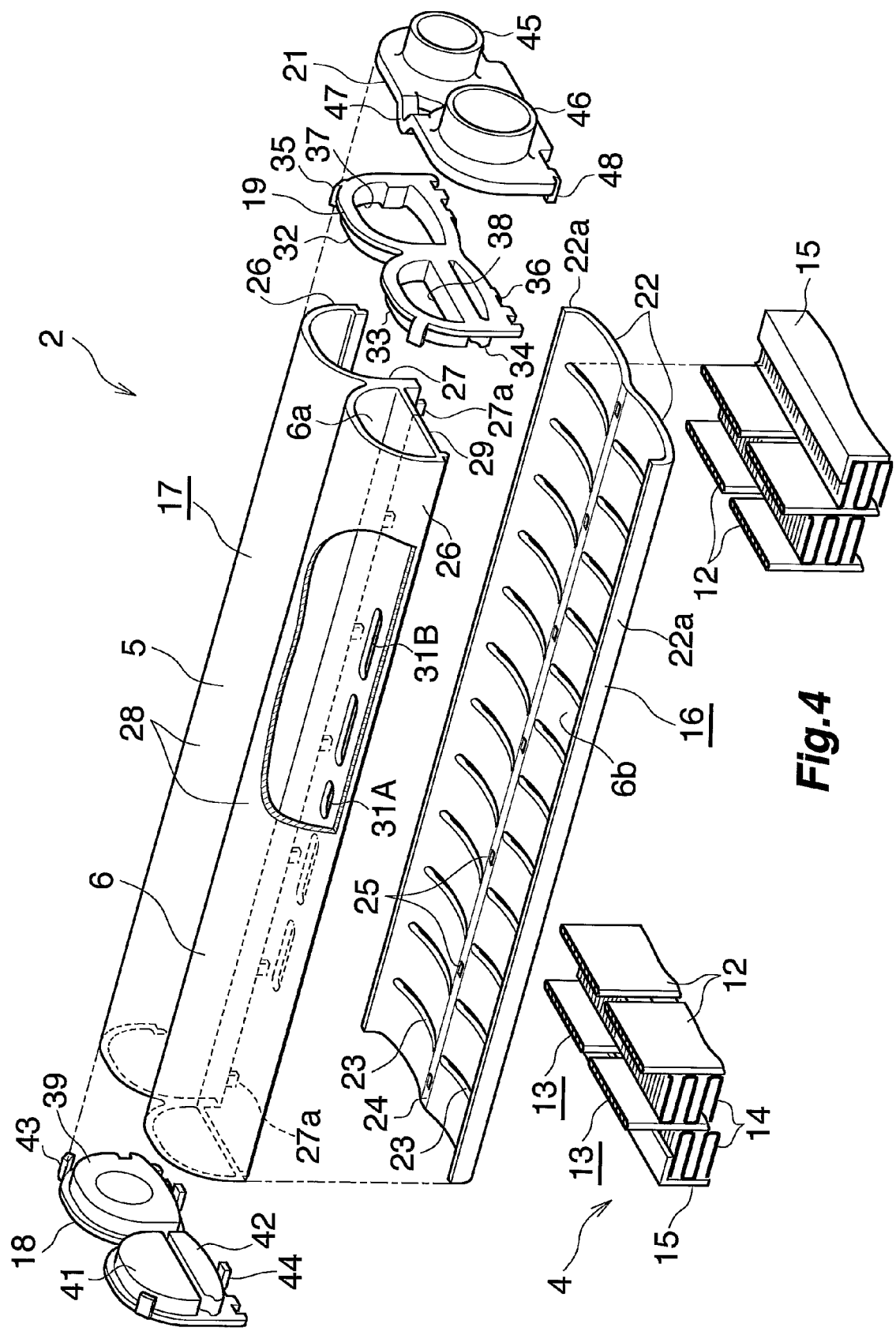
FIG. 4 is an exploded perspective view of a refrigerant inlet-outlet tank of the evaporator of FIG. 1.
Figure 5:
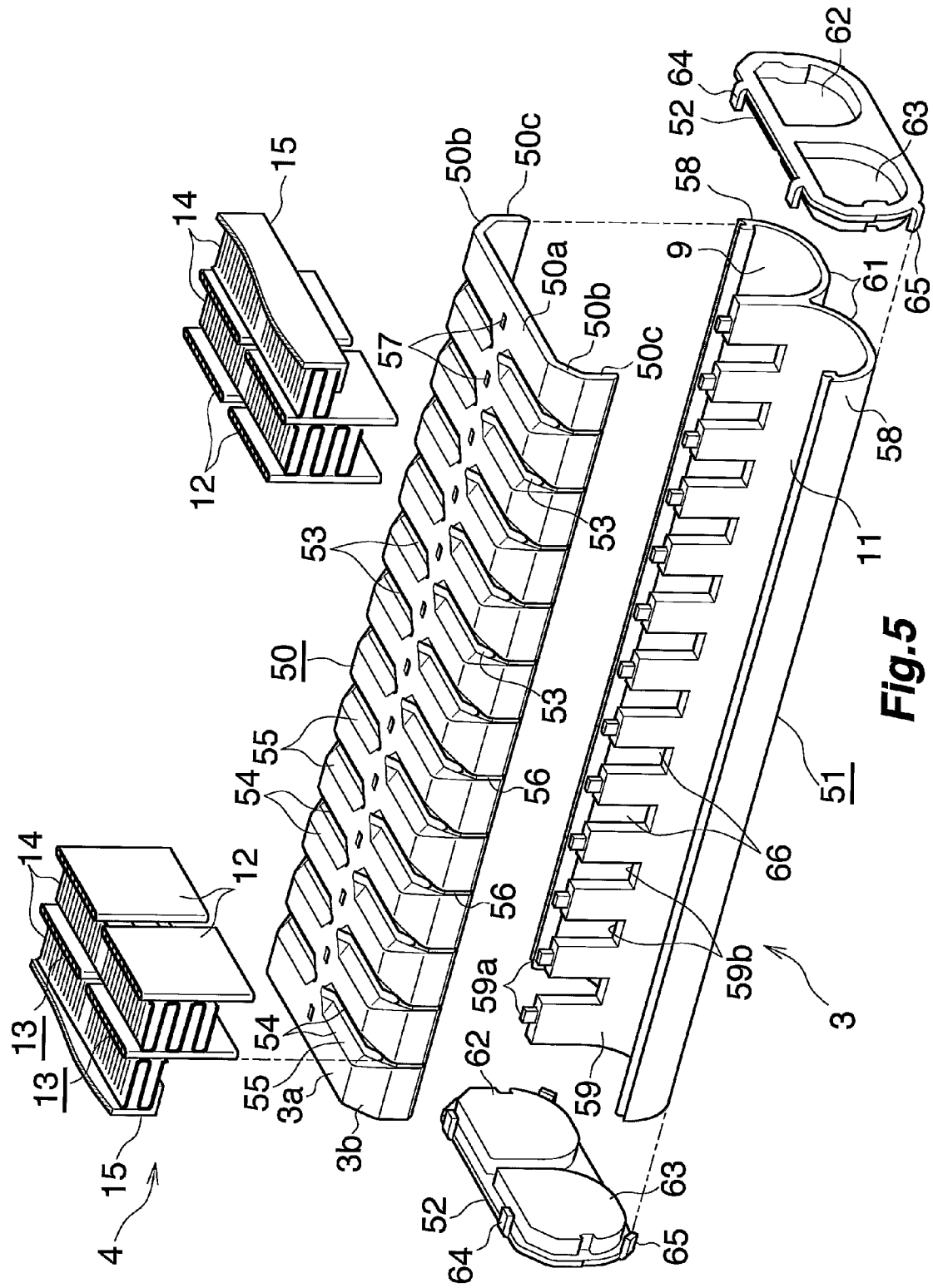
FIG. 5 is an exploded perspective view of a refrigerant turn tank of the evaporator of FIG. 1.
Figure 6:
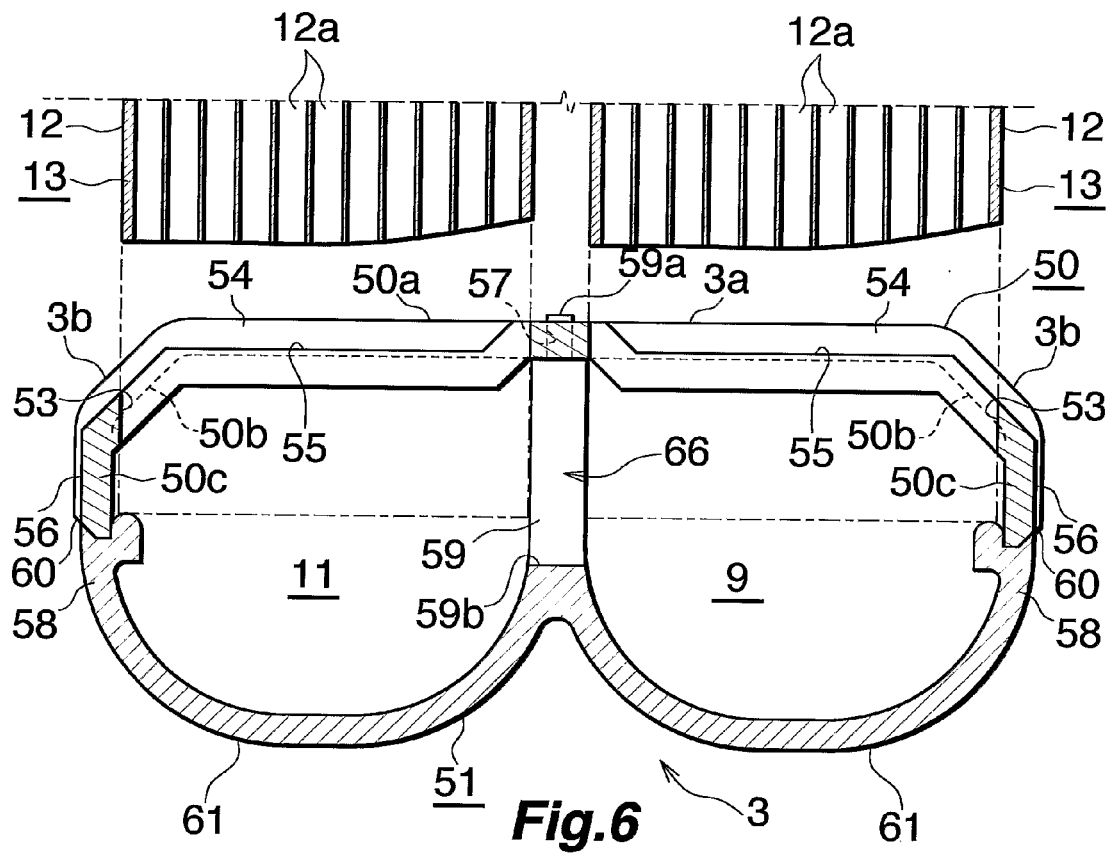
FIG. 6 is a fragmentary view in section taken along the line B-B in FIG. 2.
Figure 7:
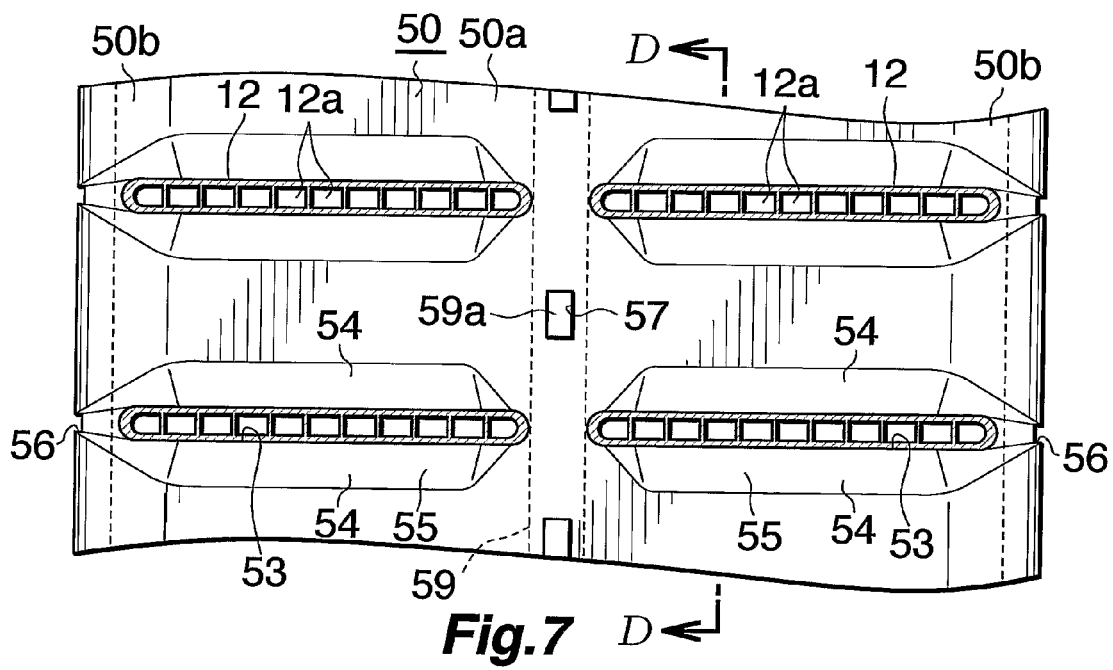
FIG. 7 is a view in section taken along the line C-C in FIG. 3.

With reference to FIGS. 3 and 4, the refrigerant inlet-outlet tank 2 comprises a platelike first member 16 made of an aluminum brazing sheet having a brazing material layer over opposite surfaces thereof and having the heat exchange tubes 12 joined thereto, a second member 17 of bare aluminum extrudate and covering the upper side of the first member 16, and aluminum caps 18, 19 made of an aluminum brazing sheet having a brazing material layer over opposite surfaces thereof and joined to opposite ends of the two members 16, 17 for closing the respective opposite end openings. An aluminum joint plate 21 elongated in the front-rear direction is brazed to the outer surface of the cap 19 at the right end so as to cover both the inlet header 5 and the outlet header 6. The refrigerant inlet and outlet pipes 7, 8 are joined to the joint plate 21.

The first member 16 has at each of the front and rear side portions thereof a curved portion 22 in the form of a circular arc of small curvature in cross section and bulging downward at its midportion. The curved portion 22 has a plurality of tube insertion holes 23, i.e., slits 23, elongated in the front-rear direction and arranged at a spacing in the left-right, i.e., lateral, direction. Each corresponding pair of slits 23 in the front and rear curved portions 22 are in the same position with respect to the lateral direction. The front edge of the front curved portion 22 and the rear edge of the rear curved portion 22 are integrally provided with respective upstanding walls 22a extending over the entire length of the member 16. The first member 16 includes between the two curved portions 22 a flat portion 24 having a plurality of through holes 25 arranged at a spacing in the lateral direction.

The second member 17 is generally m-shaped in cross section and opened downward and comprises front and rear two walls 26 extending laterally, a partition wall 27 provided in the midportion between the two walls 26 and extending laterally as separating means for dividing the interior of the refrigerant inlet-outlet tank 2 into front and rear two spaces, and two generally circular-arc connecting walls 28 bulging upward and integrally connecting the partition wall 27 to the respective front and rear walls 26 at their upper ends. The rear wall 26 and the partition wall 27 are integrally interconnected at their lower ends over the entire length of the member 17 by a flow dividing resistance plate 29. The resistance plate 29 has refrigerant passing through holes 31A, 31B elongated laterally, formed therein at a rear portion thereof other than the left and right end portions of the plate and arranged at a spacing laterally thereof. The partition wall 27 has a lower end projecting downward beyond the lower ends of the front and rear walls 26 and is integrally provided with a plurality of projections 27a projecting downward from the lower edge of the wall 27, arranged at a spacing in the lateral direction and fitted into the through holes 25 of the first member 16. The projections 27a are formed by cutting away specified portions of the partition wall 27.

The right cap 19 is integrally provided, at its front portion, with a leftward protrusion 32 to be fitted into the inlet header 5. The cap 19 is integrally provided, at its rear portion, with an upper leftward protrusion 33 to be fitted into an upper space 6a of the outlet header 6 above the resistance plate 29 and with a lower leftward protrusion 34 positioned below and spaced apart from the protrusion 33 and to be fitted into a lower space 6b of the header 6 under the plate 29. The right cap 19 has an engaging lug 35 projecting leftward and formed integrally therewith on a circular-arc portion between its upper edge and each of the front and rear side edges thereof. The right cap 19 further has an engaging lug 36 projecting leftward and formed integrally therewith on each of front and rear portions of its lower edge. A refrigerant inlet 37 is formed in the bottom wall of the leftward protrusion 32 of the front portion of the right cap 19. A refrigerant outlet 38 is formed in the bottom wall of the upper leftward protrusion 33 of the rear portion of the right cap 19. The left cap 18 is symmetric to the right cap 19. The left cap 18 has formed integrally therewith a rightward protrusion 39 fittable into the inlet header 5, an upper rightward protrusion 41 fittable into the upper space 6a of the outlet header 6 above the resistance plate 29, a lower rightward protrusion 42 fittable into the lower space 6b of the header 6 below the resistance plate 29, and upper and lower engaging lugs 43, 44 projecting rightward. No opening is formed in the bottom walls of the rightward protrusion 39 and the upper rightward protrusion 41. The two caps 18, 19 each have an upper edge comprising two generally circular-arc front and rear portions joined to each other in alignment by a midportion so as to conform in shape to the shape of the inlet-outlet tank second member 17. The two caps 18, 19 each have a lower edge comprising two generally circular-arc front and rear portions joined to each other in alignment by a middle flat portion so as to conform in shape to the shape of the inlet-outlet tank first member 16.

The joint plate 21 has a short cylindrical refrigerant inlet portion 45 communicating with the inlet 37 of the right cap 19, and a short cylindrical refrigerant outlet portion 46 communicating with the outlet 38 of the cap. Between the inlet portion 45 and the outlet portion 46, the joint plate 21 is provided with an upper and a lower bent portion 47 projecting leftward respectively from the upper and lower edges thereof. The upper bent portion 47 is engaged with the upper edge portion of the right cap 19 between the two circular-arc portions and with the portion of the second member 17 between the two connecting walls 28. The lower bent portion 47 is in engagement with the middle flat portion of lower edge of the right cap 19 between the two circular-arc portions of the lower edge and with the flat portion 24 of the first member 16. The joint plate 21 further has an engaging lug 48 formed integrally therewith and projecting leftward from each of the front and rear ends of its lower edge. The lug 48 is in engagement with the lower edge of the right cap 19. A constricted end portion of the refrigerant inlet pipe 7 is inserted into and brazed to the refrigerant inlet portion 45 of the joint plate 21, and a constricted end portion of the refrigerant outlet pipe 8 is inserted into and brazed to the outlet portion 46 of the same plate. Although not shown, an expansion valve mount member is joined to and positioned across the other end portions of the inlet pipe 7 and the outlet pipe 8.

The first and second members 16, 17 of the refrigerant inlet-outlet tank 2, the two caps 18, 19 and the joint plate 21 are brazed together in the following manner. The first and second members 16, 17 are brazed to each other utilizing the brazing material layer of the first member 16, with the projections 27a of the second member 17 inserted through the respective through holes 25 of the first member 16 in crimping engagement therewith and with the upper ends of the front and rear upstanding walls 22a of the first member 16 thereby engaged with the lower ends of the front and rear walls 26 of the second member 17. The two caps 18, 19 are brazed to the first and second members 16, 17 utilizing the brazing material layers of the caps 18, 19, with the protrusions 39, 32 of the front portions fitting in the front space inside the two members 16, 17 forwardly of the partition wall 27, with the upper protrusions 41, 33 of the rear portions fitting in the upper space inside the two members 16, 17 rearwardly of the partition wall 27 and above the resistance plate 29, with the lower protrusions 42, 34 of the rear portions fitting in the lower space rearwardly of the partition wall 27 and below the resistance plate 29, with the upper engaging lugs 43, 35 engaged with the connecting walls 28 of the second member 17, and with the lower engaging lugs 44, 36 engaged with the curved portions 22 of the first member 16. The joint plate 21 is brazed to the right cap 19 utilizing the brazing material layer of the cap 19, with the bent portions 47 in engagement with the right cap 19 and the second member 17, and with the engaging lugs 48 engaged with the right cap 19.

In this way, the refrigerant inlet-outlet tank 2 is made. The portion of the second member 17 forwardly of the partition wall 27 serves as the inlet header 2, and the portion of the member 17 rearward of the partition wall 27 as the outlet header 6. The outlet header 6 is divided by the flow dividing resistance plate 29 into upper and lower spaces 6a, 6b, which are held in communication by the refrigerant passing holes 31A, 31B. The refrigerant outlet 38 of the right cap 19 is in communication with the upper space 6a of the outlet header 6. The refrigerant inlet portion 45 of the joint plate 21 communicates with the refrigerant inlet 37, and the refrigerant outlet portion 46 thereof communicates with the outlet 38.

With reference to FIG. 3 and FIGS. 5 to 8, the refrigerant turn tank 3 comprises a platelike first member 50 made of aluminum brazing sheet having a brazing material layer over opposite surfaces thereof and having the heat exchange tubes 12 joined thereto, a second member 51 made of bare aluminum extrudate and covering the lower side of the first member 50, and aluminum caps 52 made of aluminum brazing sheet having a brazing material layer over opposite surfaces thereof for closing left and right opposite end openings. The turn tank 3 has a top surface, front and rear side surfaces and bottom surface. The top surface of the turn tank 3 is in the form of a horizontal flat surface 3a except for the front and rear outer side portions. The front and rear outer side portions of the top surface each have a low portion 3b in the form of a slope slanting downward straight forwardly or rearwardly outward. Preferably, the angle of downward inclination of the low portion 3b is at least 45 degrees. The front and rear side surfaces of the turn tank 3 extend from the respective low portions 3b of the top surface.

The first member 50 comprises a horizontal flat wall 50a, a slanting wall 50b formed integrally with each of the front and rear side edges of the horizontal wall 50a over the entire length of the member 50 and inclined downward as the wall 50b extends forwardly or rearwardly outward, and a vertical downward wall 50c formed integrally with each of the front and rear side edges of the slanting walls 50b over the entire length of the member 50. The downward wall 50c has a lower end face inclined downward as the end face extends forwardly or rearwardly inward for the outer portion of the lower end face to provide a stepped portion 60 as will be described below. The horizontal flat top surface of the turn tank 3 is provided by the upper surface of the horizontal flat wall 50a of the first member 50, the low portion 3b by the outer surface of the slanting wall 50b, and an upper portion of the front or rear side surface by the outer surface of the vertical downward wall 50c.

A plurality of tube insertion holes 53 elongated in the front-rear direction, i.e., tube insertion slits 53, are formed in each of the front and rear opposite side portions of the first member 50 and arranged in the left-right direction, i.e., laterally of the member 50. Each corresponding pair of front and rear tube insertion slits 53 are in the same position with respect to the lateral direction. The forwardly or rearwardly outer ends of the tube insertion slits 53 are positioned in the slating wall 50b, namely, in the low portion 3b of the top surface of the turn tank 3. The left and right opposite side portions of each tube insertion slit 53 in the flat wall 50a and the slanting wall 50b of the first member 50 are portions 54 inclined downward toward the tube insertion slit 53. The inclined portions 54 on the left and right opposite sides of each tube insertion hole 53 define a recess 55 (see FIG. 8). Drain grooves 56 for discharging condensation water to below the turn tank 3 are formed in the outer surfaces of the slanting wall 50b and the vertical downward wall 50c of the first member 50 and extend from the forwardly or rearwardly outer ends of the respective tube insertion holes 53. Each of the drain groove 56 has a bottom extending gradually downward as the bottom extends away from the tube insertion slit 53. The bottom of the drain groove 56 has a portion existing in the slating wall 50b, i.e., in the low portion 3b, and inclined downward straight with respect to a horizontal plane as the bottom portion extends forwardly or rearwardly outward. The bottom portion of the drain groove 56 existing in the low portion 3b is preferably at least 45 degrees in the angle of inclination with respect to the horizontal plane. The portion of the drain groove 56 existing in the vertical downward wall SOc has a lower-end opening in the lower end face of the wall 50c (see FIG. 6). The first member 70 has a plurality of through holes 57 formed in its midportion with respect to the front-rear direction and arranged laterally at a spacing. The horizontal flat wall 50a, slanting walls 50b, vertical downward walls 50c, tube insertions slits 53, inclined portions 54, drain grooves 56 and through holes 57 of the first member 50 are formed at the same time by making the member 50 from an aluminum brazing sheet by press work.

The second member 51 is generally w-shaped in cross section and opened upward, and comprises front and rear two walls 58 curved upwardly outwardly in the forward and rearward, respectively, and extending laterally, a vertical partition wall 59, provided at the midportion between the two walls 58, extending laterally and serving as separating means for dividing the interior of the refrigerant turn tank 3 into front and rear two spaces, and two connecting walls 61 integrally connecting the partition wall 59 to the respective front and rear walls 58 at their lower ends. Respective lower portions of the front and rear opposite side surfaces of the turn tank 3 are provided by the respective outer surfaces of the front and rear walls 58, and the bottom surface of the tank 3 by the lower surfaces of the connecting walls 61. The outer surface of upper edge portion of each of the front and rear walls 58 is positioned forwardly or rearwardly inwardly of the outer surface of the corresponding vertical downward wall 50c of the first member 50, whereby a stepped portion 60 is provided at the junction of the downward wall 50c of the tank first member 50 and each of the front and rear wall 58 of the tank second member 51, the outer surface of the downward wall 50c is positioned forwardly or rearwardly outwardly of the outer surface of the wall 58 with the stepped portion 60 positioned therebetween, and the lower end of the drain groove 56 is opened in its entirety at the stepped portion 60 (see FIG. 6). The outer surface of upper edge portion of each of the front and rear walls 58 is flush with the bottom of the portion of the drain groove 56 existing in the downward wall 50c. The partition wall 59 has an upper end projecting upward beyond the upper ends of the front and rear walls 58 and is provided with a plurality of projections 59a projecting upward from the upper edge thereof integrally therewith, arranged laterally at a spacing and to be fitted into the respective through holes 57 in the first member 50. The partition wall 59 is provided with refrigerant passing cutouts 59b formed in its upper edge between respective adjacent pairs of projections 59a. The projections 59a and the cutouts 59b are formed by cutting away specified portions of the partition wall 59.

The second member 51 is produced by extruding the front and rear walls 58, partition wall 59 and connecting walls 61 integrally, and cutting the partition wall 59 to form the projections 59a and cutouts 59b.

The front portion of each of the caps 52 has a laterally inward protrusion 62 formed on the laterally inner side thereof integrally therewith and fittable into the inflow header 9. The rear portion of the cap 52 has a laterally inward protrusion 63 formed on the laterally inner side thereof integrally therewith and fittable into the outflow header 11. Each cap 52 is integrally provided on its upper edge with two engaging lugs 64 projecting laterally inward and spaced apart in the front-rear direction. The cap 52 is integrally provided at a circular-arc portion between the lower edge thereof and each of the front and rear side edges thereof with an engaging lug 65 projecting laterally inward.

The first and second members 50, 51 of the turn tank 3 and the two caps 52 thereof are brazed together in the following manner. The first and second members 50, 51 are brazed to each other utilizing the brazing material layer of the first member 50, with the projections 59a of the second member 51 inserted through the respective holes 57 in crimping engagement and with the lower ends of front and rear downward walls 50c of the first member 50 in engagement with the upper ends of front and rear walls 58 of the second member 51. The two caps 52 are brazed to the first and second members 50, 51 using the brazing material layers of the caps 52, with the front protrusions 62 fitted in the space defined by the two members 50, 51 and positioned forwardly of the partition wall 59, with the rear protrusions 63 fitted in the space defined by the two members 50, 51 and positioned rearwardly of the partition wall 59, with the upper engaging lugs 64 engaged with the first member 50 and with the lower engaging lugs 65 engaged with the front and rear walls 58 of the second member 51. In this way, the refrigerant turn tank 3 is formed. The portion of the second member 51 forwardly of the partition wall 59 serves as the inflow header 9, and the portion thereof rearwardly of the partition wall 59 as the outflow header 11. The upper-end openings of the cutouts 59b in the partition wall 59 of the second member 51 are closed with the first member 50, whereby refrigerant passing holes 66 are formed.

The heat exchange tubes 12 providing the front and rear tube groups 13 are each made of an aluminum extrudate. Each tube 12 is flat, has a large width in the front-rear direction and is provided in its interior with a plurality of refrigerant channels 12a extending longitudinally of the tube and arranged in parallel (see FIGS. 6 and 7). The tubes 12 have upper end portions inserted through the slits 23 in the first member 16 of the refrigerant inlet-outlet tank 2 and are brazed to the first member 16 utilizing the brazing material layer of the member 16. The tubes 12 have lower end portions inserted through the slits 53 in the first member 50 of the refrigerant turn tank 3 and are brazed to the first member 50 utilizing the brazing material layer of the member 50.

Preferably, the heat exchange tube 12 is 0.75 to 1.5 mm in height h, i.e., in thickness in the lateral direction (see FIG. 8), 12 to 18 mm in width in the front-rear direction, 0.175 to 0.275 mm in the wall thickness of the peripheral wall thereof, 0.175 to 0.275 mm in the thickness of partition walls separating refrigerant channels from one another, 0.5 to 3.0 mm in the pitch of partition walls, and 0.35 to 0.75 mm in the radius of curvature of the outer surfaces of the front and rear opposite end walls.

In place of the heat exchange tube 12 of aluminum extrudate, an electric resistance welded tube of aluminum may be used which has a plurality of refrigerant channels formed therein by inserting inner fins into the tube. Also usable is a tube which is made from a plate prepared from an aluminum brazing sheet having an aluminum brazing material layer one surface thereof by rolling work and which comprises two flat wall forming portions joined by a connecting portion, a side wall forming portion formed on each flat wall forming portion integrally therewith and projecting from one side edge thereof opposite to the connecting portion, and a plurality of partition forming portions projecting from each flat wall forming portion integrally therewith and arranged at a spacing widthwise thereof, by bending the plate into the shape of a hairpin at the connecting portion and brazing the side wall forming portions to each other in butting relation to form partition walls by the partition forming portions.

FIG. 8 shows a corrugated fin 14 made from an aluminum brazing sheet having a brazing material layer on opposite sides thereof by shaping the sheet into a wavy form. The fin comprises crest portions 14a, furrow portions 14b and flat horizontal connecting portions 14c each interconnecting the crest portion 14a and the furrow portion. The connecting portion 14c has a plurality of louvers arranged in the front-rear direction. The corrugated fin 14 is used in common for the front and rear heat exchange tubes. The width of the fin 14 in the front-rear direction is approximately equal to the distance from the front edge of the heat exchange tube 12 in the front tube group 13 to the rear edge of the corresponding heat exchange tube 12 in the rear tube group 13. The corrugated fins 14 have front ends projecting forward beyond the front side edges of the heat exchange tubes 12 of the front group 13 (see FIG. 3). The crest portions 14a and the furrow portions 14b of the fin 14 are brazed to the heat exchange tubes 12 adjacent thereto. Instead of one corrugated fin serving for both the front and rear tube groups 13 in common, a corrugated fin may be provided between each adjacent pair of heat exchange tubes 12 of each tube group 13.

It is desired that the corrugated fin 14 be 7.0 mm to 10.0 mm in fin height H which is the straight distance from the crest portion 14a to the furrow portion 14b, and 1.3 to 1.7 mm in fin pitch P which is the pitch of connecting portions 14c. While the crest portion 14a and the furrow portion 14b of the corrugated fin 14 each comprise a flat portion brazed to the heat exchange tube 12 in intimate contact therewith, and a rounded portion provided at each of opposite sides of the flat portion and integral with the connecting portion 14c, the radius R of curvature of the rounded portion is preferably up to 0.7 mm.

The evaporator 1 is fabricated by tacking the components, other than the refrigerant inlet pipe 7 and outlet pipe 8, in combination and brazing the tacked assembly collectively.

Along with a compressor and a condenser, the evaporator 1 constitutes a refrigeration cycle wherein a chlorofluorocarbon refrigerant is used. The cycle is installed in vehicles, for example, in motor vehicles for use as an air conditioner.

With reference to FIG. 9 showing the evaporator 1 described, a two-layer refrigerant of vapor-liquid mixture phase flowing through a compressor, condenser and expansion valve enters the refrigerant inlet header 5 of the inlet-outlet tank 2 via the refrigerant inlet pipe 7, the refrigerant inlet portion 45 of the joint plate 21 and the refrigerant inlet 37 of the right cap 19 and dividedly flows into the refrigerant channels 12a of all the heat exchange tubes 12 of the front tube group 13.

The refrigerant flowing into the channels 12a of all the heat exchange tubes 12 flows down the channels 12a, ingresses into the refrigerant inflow header 9 of the refrigerant turn tank 3. The refrigerant in the header 9 flows through the refrigerant passing holes 66 of the partition wall 59 into the refrigerant outflow header 11.

The refrigerant flowing into the outflow header 11 dividedly flows into the refrigerant channels 12a of all the heat exchange tubes 12 of the rear tube group 13, changes its course and passes upward through the channels 12a into the lower space 6b of the outlet header 6. The resistance offered by the flow dividing resistance plate 29 to the flow of refrigerant enables the refrigerant to uniformly flow from the outflow header 11 into all heat exchange tubes 12 of the rear tube group 13, also causing the refrigerant to flow from the inlet header 5 into all the tubes 12 of the front tube group 13 more uniformly. As a result, the refrigerant flows through all the heat exchange tubes 12 of the two tube groups 13 in uniform quantities.

Subsequently, the refrigerant flows through the refrigerant passing holes 31A, 31B of the resistance plate 29 into the upper space 6a of the outlet header 6 and flows out of the evaporator via the refrigerant outlet 38 of the right cap 19, the outlet portion 46 of the joint plate 21 and the outlet pipe 8. While flowing through the refrigerant channels 12a of the heat exchange tubes 12 of the front tube group 13 and the refrigerant channels 12a of the heat exchange tubes 12 of the rear tube group 13, the refrigerant is subjected to heat exchange with the air flowing through the air passing clearances in the direction of arrow X shown in FIGS. 1 and 9 and flows out of the evaporator in a vapor phase.

At this time, water is produced on condensation over the surfaces of the corrugated fins 14. The condensation water flows down the top surface 3a of the turn tank 3. The condensation water flowing down the front end faces of the heat exchange tubes 12 of the front group 13 and the rear end faces of the heat exchange tubes 12 of the rear group 13 directly enters the drain grooves 56, flows through the grooves 56 and falls to below the turn tank 3 from the lower-end openings of the grooves. The condensation water flowing down the top surface 3a of the turn tank 3 enters the recesses 55 defined by left and right opposite side inclined portions 54 of the tube insertion slits 53 by virtue of a capillary effect, flows into the drain grooves 56 from the forwardly or rearwardly outer ends of the recesses 55, flows through the grooves 56 and falls to below the turn tank 3 from the lower-end openings of the grooves. The condensation water not entering the recesses 55 is entrained by the air flowing through the air passage clearances between the respective adjacent pairs of heat exchange tubes to flow downstream with respect to the direction of flow of the air, i.e., toward the front side of the evaporator, overcoming the surface tension of the water acting to remain on the horizontal flat surface 3a, flows down the front low portion 3b and falls to below the turn tank 3. The outer surface of the vertical downward wall 50c of the first member 50 is positioned forwardly outwardly of the outer surface of the front wall 58 of the second member 51, and the stepped portion 60 between the two outer surfaces acts to drain the tank of the water, permitting the water to fall to below the turn tank 3 effectively. In this way, a large quantity of condensate is prevented from collecting between the top surface 3a of the turn tank 3 and the lower ends of the corrugated fins 14 and therefore from freezing although the condensate would freeze if collecting in a large amount, whereby inefficient performance of the evaporator 1 is precluded.

One group 13 of heat exchange tubes is provided between the inlet header 5 and the inflow header 9 of the two tanks 2, 3, as well as between the outlet header 6 and the outflow header 11 thereof according to the foregoing embodiment, whereas this arrangement is not limitative; one or at least two groups 13 of heat exchange tubes may be provided between the inlet header 5 and the inflow header 9 of the two tanks 2, 3, as well as between the outlet header 6 and the outflow header 11 thereof.

Although the heat exchanger of the present invention is used as the evaporator of a motor vehicle air conditioner wherein a chlorofluorocarbon refrigerant is used, the exchanger is not limited to this use. The heat exchanger of the invention is used also as an evaporator in super critical refrigeration cycles which comprise a compressor, gas cooler, evaporator, expansion valve serving as a pressure reducer, accumulator serving as a vapor-liquid separator, and an intermediate heat exchanger for subjecting the refrigerant flowing out of the gas cooler and the refrigerant flowing out of the evaporator to heat exchange, and wherein $CO_2$ or like supercritical refrigerant is used. Such a supercritical refrigeration cycle is installed in vehicles, for example, in motor vehicles, as an air conditioner.

INDUSTRIAL APPLICABILITY

The heat exchanger of the invention is suitable for use as an evaporator in motor vehicle air conditioners which are refrigeration cycles to be installed in motor vehicles.

The invention claimed is:

1. A heat exchanger comprising:
 a heat exchange core having a plurality of heat exchange tubes arranged in a left-right direction at a spacing; and
 a lower tank disposed toward a lower end of the heat exchange core,
 wherein the heat exchange tubes are inserted through respective tube insertion holes formed in the lower tank and joined to the lower tank, the lower tank has a plurality of drain grooves each extending from a forwardly or rearwardly outer end of each of the tube insertion holes for discharging condensation water to below the lower tank therethrough, the drain grooves are provided in positions aligned with the tube insertion holes with respect to a lateral direction, the lower tank has an upper wall having a plurality of inclined portions inclined downward toward the tube insertion holes, each of the inclined portions is left and right opposite side portions adjacent to each of the tube insertion holes in the upper wall of the lower tank and defines a recess, and each of the drain grooves has one end which is directly communicated with the recess.

2. A heat exchanger according to claim 1 wherein each of the drain grooves has a bottom extending gradually downward as the bottom extends away from the tube insertion hole.

3. A heat exchanger according to claim 1 wherein the lower tank has a top surface and front and rear opposite side surfaces, and the lower tank top surface has forward and rearward outer side portions each providing a low portion gradually descending as the low portion extends forwardly or rearwardly outward, the forwardly or rearwardly outer end of each of the tube insertion holes being positioned in the low portion of the top surface.

4. A heat exchanger according to claim 3 wherein the low portion is inclined downward with respect to a horizontal plane as the low portion extends forwardly or rearwardly outward.

5. A heat exchanger according to claim 4 wherein the low portion has an angle of downward inclination of at least 45 degrees with respect to the horizontal plane.

6. A heat exchanger according to claim 3 wherein the lower tank top surface is in the form of a horizontal flat surface except for the forwardly and rearwardly outer side low portions of the top surface.

7. A heat exchanger according to claim 3 wherein each of the drain grooves extends from the forwardly or rearwardly outer end of the tube insertion hole to the corresponding front or rear side surface of the lower tank.

8. A heat exchanger according to claim 7 wherein a bottom of the drain grooves has a portion existing in the low portion of the lower tank top surface and inclined downward with respect to a horizontal plane as the bottom portion extends forwardly or rearwardly outward.

9. A heat exchanger according to claim 8 wherein the bottom portion of the drain groove existing in the low portion of the lower tank top surface is at least 45 degrees in the angle of downward inclination with respect to the horizontal plane.

10. A heat exchanger according to claim 7 wherein each of the drain grooves extends from the forwardly or rearwardly outer end of each tube insertion hole to an intermediate portion of the height of the corresponding front or rear side surface of the lower tank, and the portion of the front or rear side surface of the lower tank where the drain groove is formed is positioned forwardly or rearwardly outwardly of a tank side portion lower than the front or rear side surface portion, with a stepped portion formed therebetween, the drain groove having a lower end opened at the stepped portion.

11. A heat exchanger according to claim 10 wherein the lower tank comprises a first member having the heat exchange tubes joined thereto, and a second member joined to the first member at a portion thereof opposite to the heat exchange tubes, the first member providing the top surface of the lower tank and an upper portion of each of the front and rear opposite side surfaces thereof, the second member providing a bottom surface of the lower tank and a lower portion of each of the front and rear opposite side surfaces thereof, the tube insertion holes and the drain grooves being formed in the first member.

12. A heat exchanger according to claim 11 wherein the stepped portion is provided at a joint between the first member of the lower tank and the second member thereof, and each of front and rear opposite side surfaces of the first member is positioned forwardly or rearwardly outwardly of the corresponding front or rear side surface of the second member with the stepped portion provided therebetween, the drain groove having a lower end opened in the stepped portion.

13. A heat exchanger according to claim 1 wherein left and right opposite side portions of each tube insertion hole in a top surface of the lower tank are inclined downward toward the tube insertion hole.

14. A heat exchanger according to claim 1 wherein the heat exchange tubes arranged in a left-right direction at a spacing are in groups arranged in the front-rear direction in the form of a plurality of rows, and the drain grooves extend from respective forwardly or rearwardly outer ends of the tube insertion holes having inserted therein the respective heat exchange tubes of the tube group positioned at a forwardly or rearwardly outer end, among the tube insertion holes formed in the lower tank.

15. A heat exchanger according to claim 14 which comprises a refrigerant inlet header disposed on the front side of one end of each of the heat exchange tubes and having jointed thereto the group of heat exchange tubes in the form of at least one row, a refrigerant outlet header disposed in the rear of the inlet header and positioned toward one end of each heat exchange tube, the outlet header having joined thereto the remaining heat exchange tubes, a first intermediate header disposed toward the other end of each heat exchange tube and having joined thereto the heat exchange tubes joined to the inlet header, and a second intermediate header disposed in the rear of the first intermediate header and positioned toward the other end of each heat exchange tube, the second intermediate header having joined thereto the heat exchange tubes joined to the outlet header, the two intermediate headers being provided by dividing inside of the lower tank into a front and a rear portion by partition means, the two intermediate headers being held in communication with each other.

16. A heat exchanger according to claim 1 wherein the heat exchange tubes are flat and have their width positioned in the front-rear direction and are 0.75 to 1.5 mm in tube height which is the thickness thereof.

17. A heat exchanger according to claim 1 wherein fins are arranged between respective adjacent pairs of heat exchange tubes and are each a corrugated fin comprising crest portions, furrow portions and flat connecting portions interconnecting the crest portions and the furrow portions, the fins being 7.0 mm to 10.0 mm in height which is the straight distance from the crest portion to the furrow portion, and 1.3 to 1.7 mm in fin pitch which is the pitch of connecting portions.

18. A heat exchanger according to claim 17 wherein the crest portion and the furrow portion of the corrugated fin each comprise a flat portion, and a rounded portion provided at each of opposite sides of the flat portion and integral with the connecting portion, the rounded portion being up to 0.7 mm in radius of curvature.

19. A refrigeration cycle comprising a compressor, condenser and an evaporator, the evaporator comprising a heat exchanger according to claim 1.

20. A vehicle having installed therein a refrigeration cycle according to claim 19 as a motor vehicle air conditioner.

* * * * *